Figure 1:
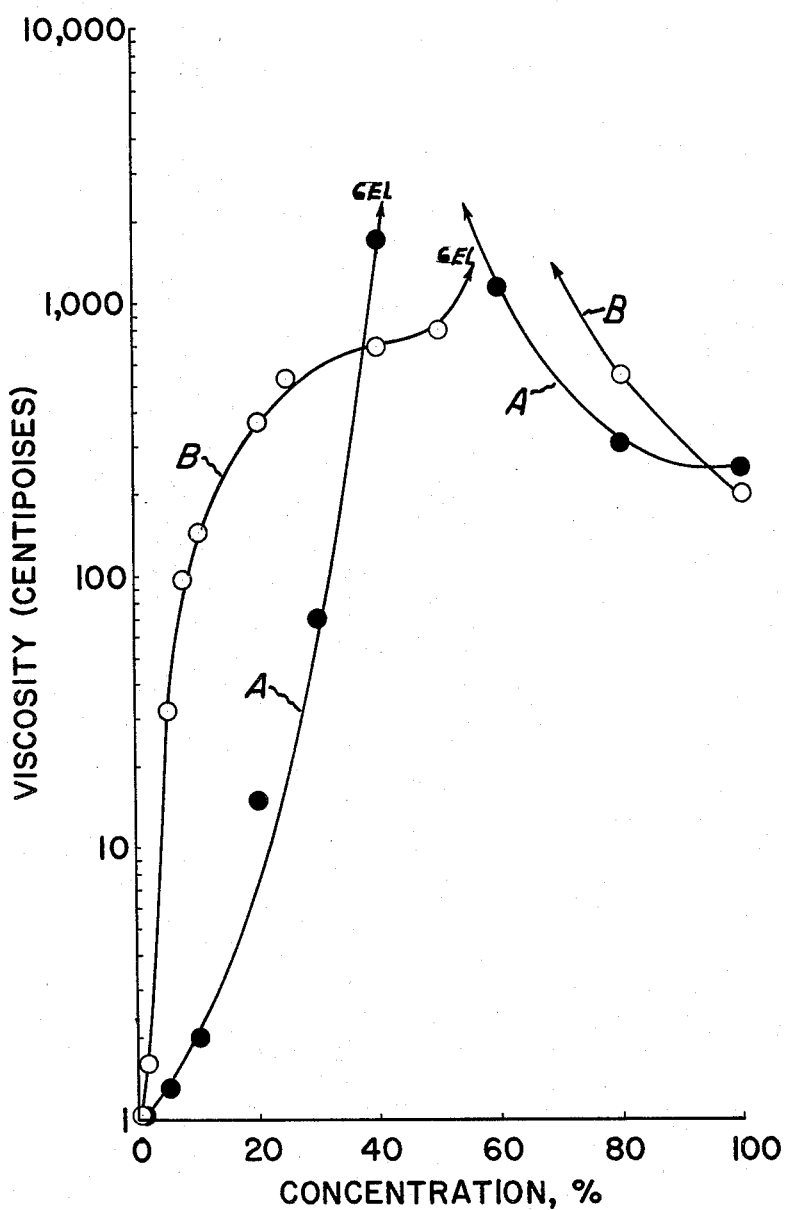

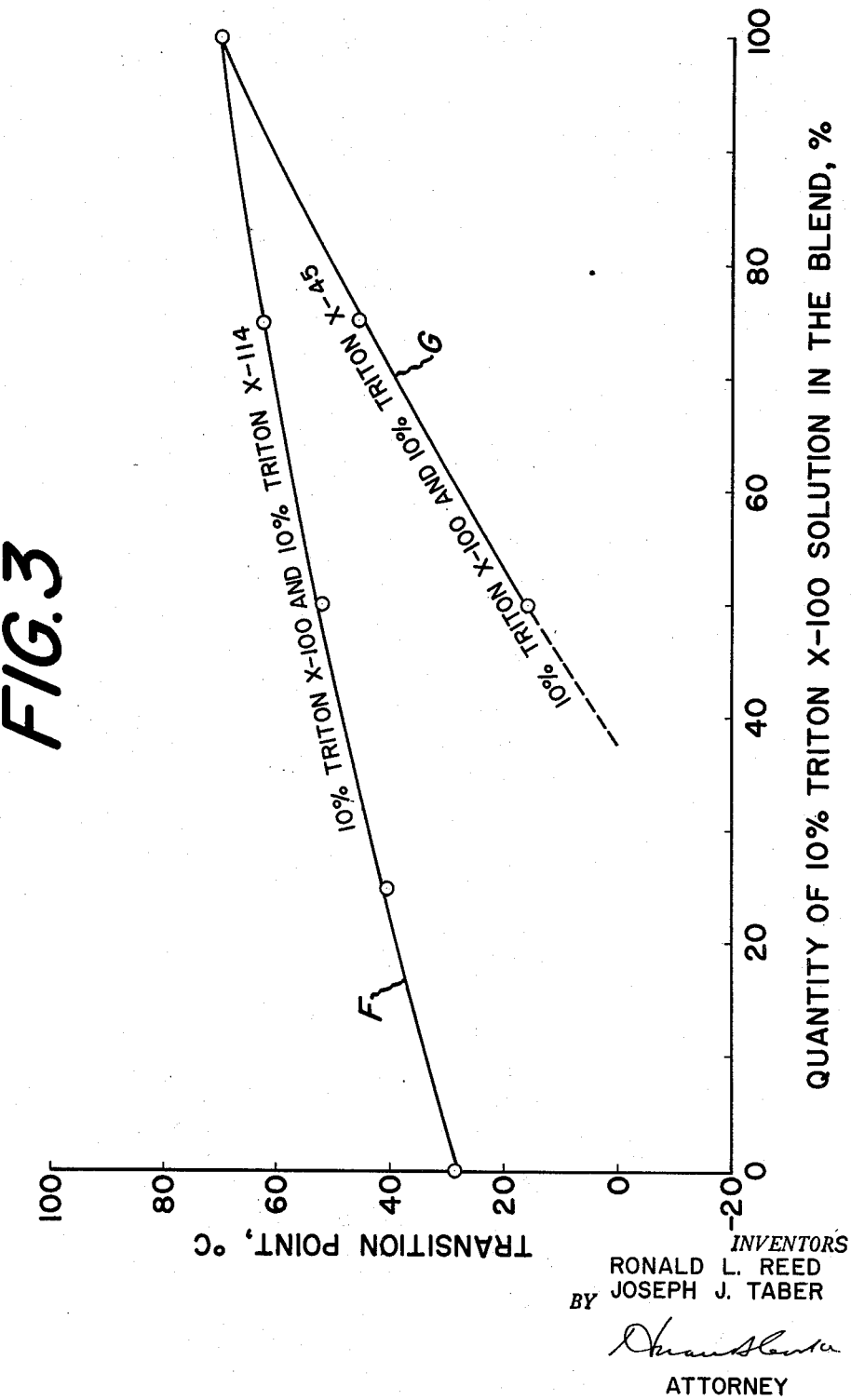

United States Patent Office 3,147,806
Patented Sept. 8, 1964

3,147,806
PROCESS FOR FRACTURING A SUBTERRANEAN
FORMATION
Ronald L. Reed, Allison Park, and Joseph J. Taber, Indiana Township, Allegheny County, Pa., assignors to Gulf Research & Development Company, Pittsburgh, Pa., a corporation of Delaware
Filed Nov. 4, 1960, Ser. No. 67,280
6 Claims. (Cl. 166—39)

This invention relates to the treatment of wells such as those drilled for oil or gas, and more particularly the invention relates to the treatment of wells with fluid compositions which have readily controllable viscosity characteristics.

In recent years one of the most commonly employed methods of treating wells to increase the productivity thereof is hydraulic fracturing. As is known, hydraulic fracturing of earth formations is usually accomplished by injecting into the well a fluid, generally of viscous nature, at a rate sufficient to build up within the well pressure greater than that which the formation can withstand thereby causing the formation to rupture. The rupture of the formation is generally indicated by a sudden drop in pressure on the fluid which is being injected into the well. After the initial breakdown of the formation, the fracturing fluid is generally continued to be forced into the induced crack so as to extend the fracture for a substantial distance into the formation. After the injection pressure has been released, the fracture produced in the earth formation tends to close due to the weight of the overburden. In order to keep the fracture open, granular solids such as sand are usually suspended in the fracturing fluid and injected into the well therewith. The granular solids upon being carried into the fracture act as props and hold open the fracture after the injection pressure is released.

The fluid which is employed to fracture earth formations must have certain desirable properties, particularly with respect to viscosity. Primarily, the fracturing fluid must be sufficiently viscous so that filtration of the fluid into the formation is sufficiently retarded in order that a high pressure can be applied to the earth formation by injecting the fracturing fluid into the well at a reasonable pumping rate. Moreover, the fracturing fluid should have a sufficiently high viscosity so that granular solid propping materials can be suspended therein and carried by the fluid into the fracture induced in the formation. Thus, while the fluid employed to fracture earth formations must exhibit a relatively high viscosity during the actual fracturing operation, it is also generally considered highly desirable that the fracturing fluid should revert to a low viscosity fluid after the fractures have been created to avoid contamination of the fractured formation. If the fracturing fluid cannot be removed from the fracture, the fracturing fluid might produce a fluid block in the fracture and the fluid permeability of the earth formation might be adversely affected instead of being benefited by the fracturing operation. The use of fluid loss agents to prevent filtration of the fracturing fluid into the earth formation possesses certain disadvantages also. The fluid loss agents which are employed in fracturing fluids must be removed from the fractured formation in order to achieve injectivity into the fracture faces. Moreover, it is frequently found that fluid loss agents are effective when the pressure existing within the earth formation is high but with low formation pressure are not effective to any appreciable extent and simply permanently plug the fracture surfaces.

The present invention provides improved methods of fracturing earth formations utilizing as the fracturing medium, fluid compositions having readily controllable viscosity characteristics. The fracturing compositions of the invention can be made such that the fracturing fluid is very viscous during injection into the well and breakdown of the earth formation, and after a fracture has been produced in the earth formation can be quickly reduced to a highly fluid state. The fracturing compositions of the invention do not require the use of gelling agents, fluid loss agents, or gel breaking materials.

In accordance with the present invention the fracturing of earth formations is effected by a hydraulic fracturing process in which the pressure transmitting medium is a liquid composition which has an inherently high rate of change of viscosity with temperature. The invention is predicated upon the discovery that certain non-ionic alkyl aryl polyether alcohols when incorporated in water produce liquid compositions which below predetermined temperatures have an exceptionally high viscosity, while at higher temperatures have a low viscosity. The liquid compositions produced by incorporating the alkyl aryl polyether alcohols in water exhibit the phenomenon wherein the viscosity of the liquid increases as the temperature increases up to a certain predetermined temperature, hereinafter referred to as the transition point or transition temperature, and when this predetermined temperature is exceeded the viscosity of the liquid decreases rapidly. By employing alkyl aryl polyether alcohols in water in suitable proportions high viscosity liquids can be produced which at one temperature exhibit sufficient resistance to flow into permeable formations when introduced into a well to permit fracturing pressures to be built up within the formation. Then after the fracture is created and the temperature of the fracturing fluid is raised beyond the transition point at which the fracturing fluid reverts from a high viscosity liquid to a low viscosity liquid, the fracturing fluid becomes thin enough to flow back out of the well. Thus, it is seen that the invention provides fluid compositions having a desirably high temporary viscosity which are eminently suitable as hydraulic fracturing media. The fracturing fluids of the invention do not require the use of gelling agents to produce the desired high viscosity characteristics nor are gel breakers or other extraneous chemical agents required to reduce the viscosity of the fracturing fluid after formation of the fracture in the earth formation.

As is known, a hydraulic fracturing fluid should have a viscosity of between about 10 and 25,000 centipoises or higher depending upon the individual well conditions. In accordance with the present invention it is preferred in general to employ a fracturing fluid which exhibits a suitably high viscosity at ambient surface temperatures and which will revert to a highly liquid state at the temperatures normally prevailing in the earth formation at the depth at which the fracture is desired. Normally the formation temperature will increase as the depth of the borehole increases and as a rule of thumb the formation temperature increases about one degree for every 50–60 feet of depth. However, abnormalities in temperature gradients occur which do not always permit the application of this rule of thumb. If the fluid composition employed as the fracturing fluid has a transition point within this range, it is not necessary to employ measures for cooling the fluid prior to or during its injection into the well nor will it be necessary to employ external sources of heat within the well to cause the fracturing fluid to revert to a highly fluid state after creation of the formation fracture. However, in some instances such as where there exists a relatively small temperature differential between the surface temperature and the formation temperature at the depth where the fracture is desired, the invention contemplates the use of fluid compositions having transition points outside of this temperature range. In such instances it is possible to employ such expedients as cooling the fracturing fluid to a temperature below its transition point prior to injecting the fluid into the well bore. Likewise if the transition point of the fracturing fluid is a higher temperature than the normal formation temperature, external heat can be utilized in the formation after the fracture has been developed to expedite the change in fluidity. Such external heat may be supplied by conventional heating equipment used in the treatment of wells. Thus, the choice of fracturing fluid for use in a particular application will depend upon various factors such as the viscosity-temperature characteristics of the fracturing fluid, the heat characteristics of the formation, availability of equipment for cooling the fracturing fluid, the availability of well heating equipment, and so forth, and can best be left to the discretion of those practicing the present invention.

Alkyl aryl polyether alcohols particularly suitable in the formulation of hydraulic fracturing fluids in accordance with the invention are the octyl phenol-ethylene oxide adducts sold under the trade name Triton X–100 and Triton X–114 by Rohm & Haas Company. Triton X–100 is a non-ionic liquid octyl phenol-ethylene oxide adduct containing approximately 10 mols of ethylene oxide per mol of octyl phenol. This material is a transparent, pale, amber, viscous liquid, slightly hydroscopic, and water soluble. Triton X–114 is a non-ionic liquid octyl phenol-ethylene oxide adduct containing approximately 8 mols of ethylene oxide per mol of octyl phenol. Another suitable alkyl aryl polyether alcohol is manufactured and sold by the Jefferson Chemical Company under the trade name Jefferson Surfonic N–95. This material, like Triton X–100, is also an alkyl aryl polyether alcohol, namely, a nonyl phenol-ethylene oxide adduct. Other non-ionic, water-soluble, alkyl aryl polyether alcohols are also suitable in the practice of this invention. These other materials, like Triton X–114 and Jefferson Surfonic N–95, might be made from an alkyl phenol wherein the alkyl group contains from 5–12 carbon atoms and an alkylene oxide wherein the alkylene proportion thereof contains from 2–40 carbon atoms.

The alkyl aryl polyether alcohols of the invention can be designated by the general formula:

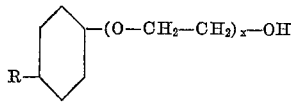

wherein R is an alkyl radical of from 5–12 carbon atoms, and $x$ is an integer of from 2–40.

The fracturing fluids of the invention are prepared by incorporating the alkyl aryl polyether alcohols in water in amounts sufficient to produce a liquid of increased viscosity. The specific amount of the alkyl aryl polyether alcohols to be employed in each instance will depend upon the particular alcohol and the ultimate viscosity desired. In general, the alkyl aryl polyether alcohols are employed in water solutions in amounts ranging from about 1/10 to 40 percent by weight, more or less.

FIGURE 1 shows a plot of the apparent viscosity versus concentration of typical fluid compositions of the invention. Curve A is a plot of the viscosity versus concentration by weight of Triton X–100 in water at a temperature of 25° C. Curve B is a plot of the viscosity versus concentration by weight of Triton X–114 in water at a temperature of 20° C.

Figure 2:
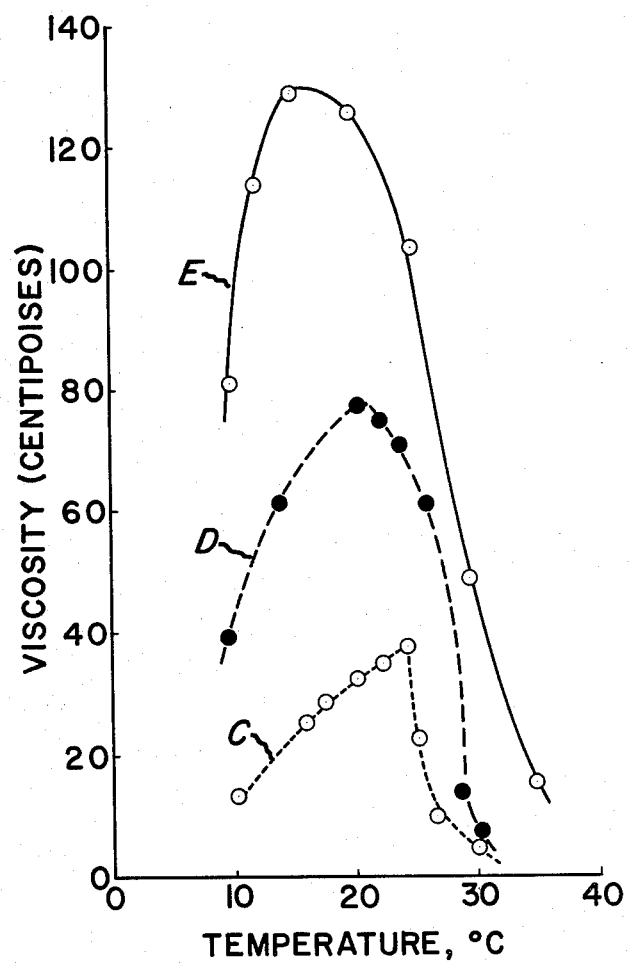

FIGURE 2 shows a plot of the apparent viscosity versus temperature of typical fluid compositions of the invention. Curve C is a plot of viscosity versus temperature of an aqueous solution containing 5 percent by weight of Triton X–114. Curve D is a plot of the viscosity versus temperature of an aqueous solution of 7.5 percent by weight of Triton X–114. Curve E is a plot of the viscosity versus temperature of an aqueous solution containing 10 percent by weight of Triton X–114. These curves show clearly the significant effect of temperature on the viscosity of the liquid compositions. In each instance, the viscosity of the liquids decreased rapidly when the temperature increased to beyond the transition temperature of the liquid.

It is within the purview of the invention to employ in the treatment of wells fluid compositions comprising water and a combination of several alkyl aryl polyether alcohols. By employing in proper proportions several of the alkyl aryl polyether alcohols in water solution, it is possible to vary the transition point of the liquid, that is, the temperature at which the change in viscosity of the liquid as a function of temperature is reversed.

FIGURE 3 is a plot of the transition temperature versus composition for liquids comprising water and a combination of alkyl aryl polyether alcohols in different proportions. Curve F is a plot of the transition temperature for an aqueous solution of Triton X–114 and Triton X–100 in various proportions. Curve G is a plot of the transition temperature for an aqueous solution of Triton X–45 (an alkylphenol polyether alcohol) and Triton X–100 in various proportions.

In carrying out a hydraulic fracturing operation in accordance with the invention any of the solid granular materials commonly employed in the art as propping agents can be incorporated in the fracturing fluid so as to be carried thereby into the formation fracture. These granular propping agents will settle out and be disposed within the formation fracture to maintain the fracture open after the fracturing pressure has been released. Such propping agents include, for example, sand, ceramic material, metal chips, wood chips, and the like.

In a specific embodiment of the invention an earth formation having an oil-producing stratum approximately eight feet thick at a depth of approximately 2,856 feet is treated. A fracture is desired in the oil-producing stratum at approximately 2,852 feet and the formation temperature at this depth is approximately 100° F. A packer is set in the well on the tubing to isolate and confine the selected interval at which the fracture is desired. A fracturing liquid comprising water containing 8.3 percent by weight Triton X–114 and 1.7 percent Triton X–100 is pumped into the well at a rate of about 20 barrels per minute. The fracturing fluid is maintained at surface temperature at which its viscosity is substantially increased to produce a fluid having low penetrating characteristics. The fracturing fluid is continuously injected into the well at a rate of about 20–25 barrels per minute until sufficient hydraulic pressure is obtained to overcome the overburden and to cause the formation to fracture. The occurrence of the fracture is usually indicated by a sudden decrease in pump pressure. After fracture occurs, a propping agent consisting of Ottawa sand of about 12–20 mesh particle size is incorporated in the fracturing fluid. The propping agent is mixed with the fracturing fluid as it is injected into the well at a rate to provide about three pounds of propping agent per gallon of fracturing fluid. The fracturing fluid containing the propping agent is continuously pumped into the fracture to extend the fracture and to deposit the propping agent therein. Additional water containing no propping agent is then injected into the well to flush the fracturing fluid and propping agent into the fracture. The well is then shut in to allow the fracturing fluid to warm up to the ambient formation temperature. The fracturing fluid upon being warmed to above about 98° F., which is the transition temperature of the liquid, undergoes a rapid decrease in viscosity and reverts to a highly fluid state which permits it to be withdrawn from the well during subsequent production. The sand particles are deposited within the fracture to maintain the fracture open.

A particularly advantageous application of the present invention is in the treatment of water injection wells. In such applications it is advantageous to permit the fracturing fluid of the invention to remain within the induced fracture and to initiate injection of water substantially immediately after completion of the injection of the fracturing fluid. By this technique the rate of injection of the water increases as the viscosity of the fracturing fluid within the fracture decreases which occurs when the fracturing fluid is heated to a temperature higher than its particular transition temperature. Moreover, the alkyl aryl polyether alcohol components of the fracturing fluids of the invention function as surfactants and in this capacity serve to clean up the fracture faces, thereby increasing the water injectivity.

It is to be understood that the foregoing description of a specific embodiment of the invention is by way of illustration only and that various modifications and variations can be made in the fracturing technique without departing from the invention. The invention can be utilized to fracture oil, gas, or water formations to produce therein "clean" or uncontaminated fractures of exceptionally high permeability. The fracturing technique of the invention is extremely valuable in secondary recovery operations employing gas or water drives where it is desired to improve the permeability of the formation.

From the foregoing, it will be apparent that the present invention provides a hydraulic fracturing process by means of which very clean and uncontaminated fractures are produced in earth formations. The fracturing media of the invention exhibits a desirably high temporary viscosity and does not require the use of gelling agents, fluid loss agents, or gel breaking materials.

Those modifications and variations which fall within the spirit of the invention and the scope of the appended claims are to be considered part of the invention.

We claim:

1. A process for treating a subterranean formation penetrated by a well bore which comprises displacing down said well bore and into contact with the formation a fracturing liquid consisting essentially of an aqueous solution of an alkyl phenyl polyoxyethylene alcohol in which the alkyl group contains 5 to 12 carbon atoms and there are 2 to 40 ethylene oxide groups for each phenyl group, the concentration of the alkyl phenyl polyoxyethylene alcohol in the solution being such that the aqueous solution has a viscosity in excess of 10 centipoises at ambient surface temperature, said aqueous solution having a transition temperature higher than the temperature at which the aqueous solution is displaced into the well whereby the viscosity of the aqueous solution increases as it travels down the well, applying a pressure onto the fracturing liquid to overcome the overburden pressure of the formation and form a fracture extending from the well bore, and thereafter heating the fracturing liquid in the thus formed fracture to a temperature higher than the transition temperature to substantially reduce the viscosity of the fracturing liquid whereby said fracturing liquid flows readily from the formation adjacent the fracture.

2. A process as set forth in claim 1 in which the transition temperature is lower than the formation temperature and the heating of the fracturing liquid is accomplished by maintaining said fracturing liquid in the fracture until the fracturing liquid attains substantially the temperature of the formation.

3. A process as set forth in claim 1 in which the concentration of the alkyl phenyl polyoxyethylene alcohol in the fracturing liquid is between about 5 and 10 percent by weight.

4. A process for producing formation liquids from a subterranean formation penetrated by a well bore which comprises displacing into said well bore at substantially ambient surface temperature a fracturing liquid having an inherently high rate of change of viscosity with temperature and a transition temperature higher than the ambient surface temperature and lower than the formation temperature whereby the viscosity of the fracturing liquid increases as the liquid travels down the well, said fracturing liquid having a viscosity at the formation temperature lower than the viscosity at the ambient surface temperature and consisting essentially of an aqueous solution of an alkyl phenyl polyoxyethylene alcohol in which the alkyl groups contain 5 to 12 carbon atoms and there are 2 to 40 ethylene oxide groups per phenyl group, the concentration of the alkyl phenyl polyoxyethylene alcohol in the aqueous solution being less than 40 percent and such that the fracturing liquid has a viscosity in excess of 10 centipoises at ambient surface temperature, applying a pressure to the fracturing liquid adequate to overcome the overburden pressure and fracture the subterranean formation, displacing the fracturing liquid into the fracture, maintaining fracturing liquid in the fracture for a peroid adequate to raise the temperature of the fracturing liquid substantially to the formation temperature, and producing liquids from the formation through the fracture into the well.

5. A process for producing formation liquids from a subterranean formation penetrated by a well bore comprising displacing into said well bore fracturing liquid having a transition temperature lower than the temperature of the formation, the temperature of the fracturing liquid displaced into the well being lower than the transition temperature whereby the viscosity of the fracturing liquid increases as it travels down the well, said fracturing liquid consisting essentially of an aqueous solution of at least two different alkyl phenyl polyoxyethylene alcohols in concentrations to produce an aqueous solution having a transition temperature higher than the ambient surface temperature and less than the formation temperature, each of said alkyl phenyl polyoxyethylene alcohols having 5 to 12 carbon atoms in the alkyl group and 2 to 40 ethylene oxide groups per phenyl group, the concentration of the alkyl phenyl polyoxyethylene alcohols in the aqueous solution being such that the fracturing liquid has a viscosity in excess of 10 centipoises at ambient surface temperature, applying a pressure to the fracturing liquid adequate to overcome the overburden pressure and fracture the subterranean formation, displacing the fracturing liquid into the fracture, maintaining fracturing liquid in the fracture for a period adequate to raise the temperature of the fracturing liquid substantially to the formation temperature, and producing liquids from the formation through the fracture into the well.

6. A process as set forth in claim 5 in which one of the alkyl phenyl polyoxyethylene alcohols is an octyl phenol ethylene oxide adduct containing approximately 10 mols of ethylene oxide per mol of octyl phenol and the other alkyl phenyl polyoxyethylene alcohol is an octyl phenol ethylene oxide adduct containing approximately 8 mols of ethylene oxide per mol of octyl phenol.

References Cited in the file of this patent

UNITED STATES PATENTS

| 2,772,737 | Bond et al. | Dec. 4, 1956 |
| 2,851,105 | Garst | Sept. 9, 1958 |

OTHER REFERENCES

Triton Surface Active Agents, 1951, page 26.